United States Patent [19]
Johnson et al.

[11] Patent Number: 5,509,125
[45] Date of Patent: Apr. 16, 1996

[54] SYSTEM AND METHOD FOR FAIR ARBITRATION ON A MULTI-DOMAIN MULTIPROCESSOR BUS

[75] Inventors: Scott D. Johnson, Mountain View; John R. Carlson, Santa Clara; Martin M. Deneroff, Palo Alto, all of Calif.

[73] Assignee: Silicon Graphics, Inc., Mountain View, Calif.

[21] Appl. No.: 128,082

[22] Filed: Sep. 29, 1993

[51] Int. Cl.⁶ .................................................. H01J 13/00
[52] U.S. Cl. .......................................... 395/300; 395/299
[58] Field of Search .................................. 395/725, 325, 395/296, 299, 300, 291, 303

[56] References Cited

U.S. PATENT DOCUMENTS

| | | | |
|---|---|---|---|
| 4,320,467 | 3/1982 | Glass | 395/325 |
| 4,473,880 | 9/1984 | Budde et al. | 364/DIG. 1 |
| 4,779,089 | 10/1988 | Theus | 340/825.5 |
| 4,785,394 | 11/1988 | Fischer | 395/725 |
| 5,088,024 | 2/1992 | Vernon et al. | 395/725 |
| 5,261,109 | 11/1993 | Cadambi et al. | 395/725 |
| 5,280,591 | 1/1994 | Garcia et al. | 395/325 |
| 5,301,283 | 4/1994 | Thacker et al. | 395/325 |

*Primary Examiner*—Jack B. Harvey
*Assistant Examiner*—Xuong M. Chung-Trans
*Attorney, Agent, or Firm*—Sterne, Kessler, Goldstein & Fox

[57] ABSTRACT

A multi-domain, distributed arbitration system, and a method performed by a plurality of arbiters to control arbitration of requests for a multiprocessor system bus. The requests are generated by a plurality of nodes coupled to the multiprocessor system bus. The requests are presented on a plurality of arbitration request lines. Each node comprises one of the arbiters such that each arbiter is associated with a corresponding node. A plurality of domains are created by the arbiters based on a bit-wise combination of the requests on the arbitration lines. A priority is assigned to each domain relative to the other domains. Each arbiter monitors the requests on the arbitration request lines and generates an i_win result that indicates whether or not the associated node is an overall arbitration winner if a request from that node is pending. In addition, the arbiters generate a who_ won result that indicates which node was the overall arbitration winner according to the assigned priorities.

14 Claims, 2 Drawing Sheets

SYSTEM AND METHOD FOR FAIR ARBITRATION ON A MULTI-DOMAIN MULTIPROCESSOR BUS

BACKGROUND OF THE INVENTION

1. Field of the Invention

The present invention relates generally to the field of computers, and more particularly, to a system and method for fair arbitration on a multiprocessor bus.

2. Related Art

Modern multiprocessing systems typically have a plurality of processors, a main shared memory and other input/output (I/O) devices, such as peripherals, that are coupled to a main system bus. To permit maximum utilization of the bus these systems often use split transactions. (For simplification, the processors, main memory and I/O devices will be referred to as "nodes".) A split transaction is a read transaction that is split into a read request transaction that contains the address of the data requested, and a reply transaction that contains the requested data. Reply transactions are also called read responses. Each transaction must be tagged so that the requesting node and the replying node (e.g., main memory or a processor having the requested data in its cache) can keep track of the status of the read request. When individual transactions being performed by a node are long in duration, a split transaction approach allows several transactions to simultaneously occupy the bus, thus increasing the effective bandwidth of the bus.

In order to support split transactions on a shared bus, both the requesting node and the replying node must arbitrate for the bus to perform their respective functions. Conventionally, arbitration is handled by a single bus arbiter. The single bus arbiter receives all bus requests and grants use of the bus according to an arbitration scheme. However, in systems which employ a single bus arbiter, several bus cycles are required to perform each bus arbitration. Specifically, the requesting nodes first send their request(s) to the arbiter. Then the arbiter makes the arbitration decision and then communicates that decision to all nodes on the system bus.

What is desired is a mechanism to handle system bus arbitration in a multiprocessor architecture that minimizes the time for arbitration decisions to be completed.

SUMMARY OF THE INVENTION

The present invention is directed to an arbitration scheme for a multiboard multiprocessing system which prioritizes system bus request types. Each board in the system is characterized as a node. Each node includes an arbiter that comprises means for performing a bit-wise combination of bus arbitration lines to generate the multiple domains. A priority is assigned to each domain relative to the other domains. The nodes have the ability to request the use of the system bus in one of the domains.

Each arbiter performs two functions. First, each arbiter determines whether the associated node was the overall arbitration winner (i.e., it makes an "i_win" determination). Second, each arbiter determines which node was the overall arbitration winner (i.e., "who_won") for future arbitration priority purposes. The node that is the overall arbitration winner still needs to perform the second function for future arbitration priority purposes. These determinations are done in parallel, because the i_win determination must be determined in one bus cycle. The latter determination of who_won the overall winner need only be determined before the next arbitration cycle.

In the preferred embodiment, there are three arbitration vectors, U, A and D, which correspond to the three arbitration bus lines. Five domains are created from these arbitration vectors. The arbiters independently perform a round-robin determination for each domain to generate five domain winners (or fewer if there were no requesters in some domains), based on the arbitration priority and domain definitions. The winner of a domain is given the lowest priority in the next arbitration for that domain only if that winner ultimately wins overall system bus arbitration. Once the five winners are determined, the arbiters select the winner with the highest domain priority. Thus, if data response requests exist, the winner of that domain will automatically gain the data bus, because of that domain's highest priority assignment. It is possible that more that one domain winner may be granted use of the system bus depending on the configuration of the bus and how the domains are created.

BRIEF DESCRIPTION OF THE FIGURES

The invention will be better understood if reference is made to the accompanying drawings in which.

In the drawings, like reference numbers indicate identical or functionally similar elements. Additionally, the left-most digit of the reference number identifies the drawing in which the reference number first appears.

DETAILED DESCRIPTION OF THE PREFERRED EMBODIMENTS

The following two text books provide further discussions of modern system buses and transactions between nodes on such buses: John L. Hennessy et al., "Computer Architecture—A Quantitative Approach", (Morgan Kaufmann Publishers, Inc., San Mateo, Calif., 1990); and Stephen B. Furber, "VLSI RISC Architecture and Organization", (Marcel Dekker, Inc., New York, N.Y., 1989), which are both incorporated herein by reference.

Figure 1:
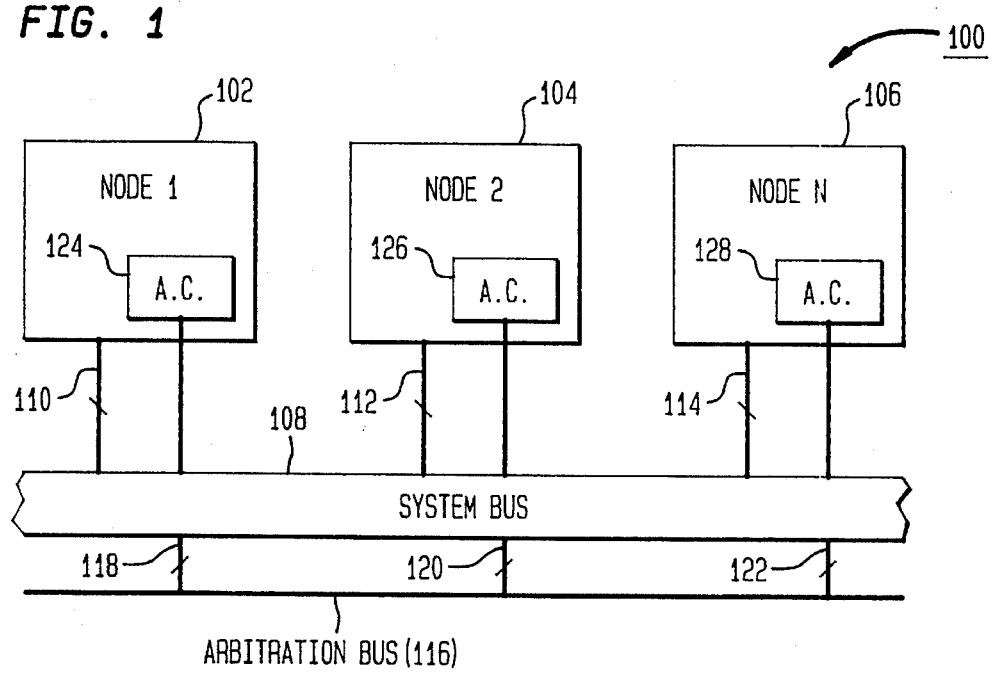
FIG. 1 shows a high level representative block diagram of multiprocessing system 100 according to the present invention.

The present invention is directed to an arbitration system and method for a multi-board multiprocessing system which prioritizes system bus request types. Each board (hereafter referred to as a node) in the system has the ability to request the use of the system bus in one of five domains (described below). An example multiprocessing system is shown at 100 in FIG. 1. A plurality of nodes, including node 1, node 2 . . . node n are shown at 102, 104 and 106, respectively. Nodes 102, 104 and 106 are coupled to a system bus 108 via bus couplers 110, 112 and 114, respectively. System bus 108 preferably includes a 256 bit wide data bus, a 40 bit wide address bus and an 8 bit wide command bus. The command bus and other lines (not shown) of the system bus 108 will not be described herein since their functionality is beyond the scope of the invention and their description is not necessary to carry out the present invention.

The multiprocessing system may have many nodes including multiple microprocessors, a shared memory, and various peripheral and input/output devices, as would be apparent to a person skilled in the relevant art.

Nodes 102, 104 and 106 are also coupled to an arbitration bus 116 via arbitration bus couplers 118, 120 and 122, respectively. Bus 116 comprises three arbitration lines including an address line (A), a data line (D), and an urgent line (U) (the A, D, and U lines are not explicitly shown in FIG. 1) for each node.

Read requests require only the address bus, and thus arbitrate on just the A line. Read responses require only the data bus, and thus arbitrate on just the D line. Write operations require both the address bus and the data bus, and thus arbitrate on both the A and D lines. In addition, if an operation requires more immediate action, it can also arbitrate on the U line to increase its priority in the arbitration scheme.

In a preferred embodiment of the present invention, arbitration bus 116 is not used. Alternatively, three arbitration vectors U, A, and D, are formed by the concatenation of the address and command lines. During the arbitration cycle, the upper third of the concatenated address and command buses are used to make urgent (high priority) requests. The upper third 16 bits of the concatenated bus therefore form the arbitration vector U. The middle third of the concatenated address and command buses are used for address arbitration. The middle third 16 bits therefore form arbitration vector A. Similarly, the lower third of the concatenated address and command buses is used for data arbitration. The lower third 16 bits form the arbitration vector D. From these arbitration vectors, multiple domains are created. A domain vector is created by performing a Boolean or logical combination of arbitration vectors on a bit-wise basis. Each domain vector represents a set of nodes wanting access to the system bus 108 to perform some operation.

According to the preferred embodiment, five domains are created from the three arbitration vectors U, A and D, each based on bit-wise Boolean or logical operations, such as the AND operation, inversions, ORs, and the like. One domain vector is called the UAD and is simply a bit-wise AND of the three arbitration vectors. Another is called DnotA and is the AND of the D vector with the inverted A vector (where the DnotA domain represents all those nodes wanting to use the data bus but not the address bus). The following is a listing of the five domains in their preferred priority order, showing their mappings to the arbitration lines:

(1) the data response (DnotA), (2) the urgent read (UAnotD), (3) the urgent write (UAD), (4) the non-urgent read (AnotD), and (5) the non-urgent write (AD).

Figure 2:
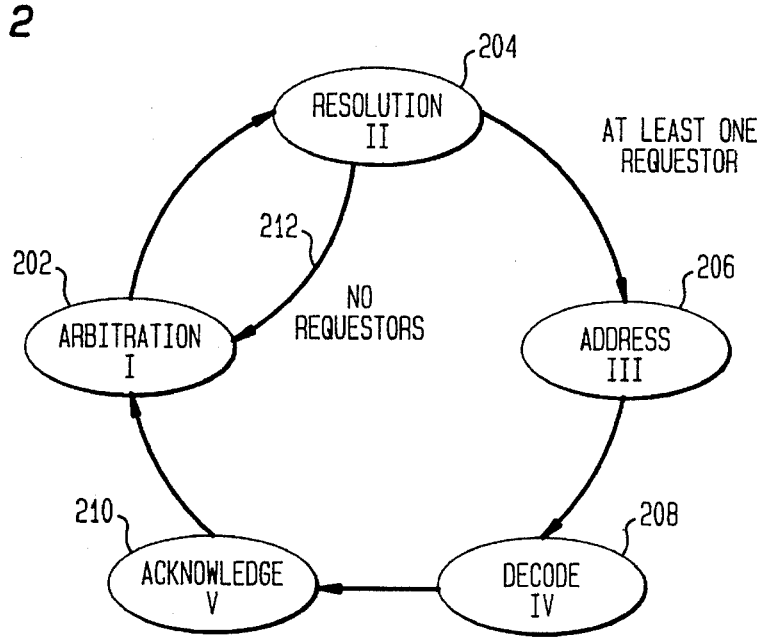
FIG. 2 is a state diagram of the system bus 108.

FIG. 2 is a state diagram of the system bus 108. Each bus transaction consists of five cycles: arbitration (I), arbitration resolution (II), address (III), flow control or decode (IV), and acknowledge (V), labeled 202, 204, 206, 208 and 210, respectively. When the system bus 108 is idle, it drops into a two-cycle mode, as shown by arrow 212. This allows new requests to appear on an idle bus as soon as they are ready, instead of waiting for the arbitration cycle 202 to arrive.

During the arbitration resolution cycle 204, no signals are driven on the address bus. As will be discussed below in detail, an overall arbitration winner is resolved during cycle 204. However, additional information for subsequent arbitrations is resolved during the cycles preceding the next arbitration cycle 204. The functions performed during the address, decode and acknowledge cycles 206, 208 and 210 will be described below. However, other data processing functions not necessary for description of the arbitration system and method of the present invention will be omitted.

During the bus arbitration during cycle 202, bus arbitration takes into consideration all three lines of the arbitration bus 116 to determine winners, for it is possible that two domains (say DnotA and UAnotD) both win arbitration. The bus arbitration process is distributed among each of the nodes. Each node 102, 104 and 106 includes an arbitration controller (also called an arbiter) 124, 126 and 128, respectively.

Arbiters 124, 126 and 128 perform two necessary functions. First, each arbiter determines whether the associated node was the overall arbitration winner (i.e., it makes an "i_win" determination). Second, each arbiter determines which node was the overall arbitration winner (i.e., "who_won") for future arbitration priority purposes. The node that is the overall arbitration winner must perform the second function for future arbitration priority purposes. One bus cycle is an extremely short amount of time to do complicated calculations, and thus the process is streamlined to perform the i_win determination, while the who_won determination is completed in subsequent cycles. These determinations are done in parallel, because the i_win determination must be determined in one bus cycle (i.e., 20 ns in the preferred embodiment; of course, a bus cycle can be of any length of time dependent upon the speed of the bus). For the latter determination of who_won, the overall winner need only be determined before the next arbitration cycle, which is 5 system cycles later.

Thus, given the arbitration priority and domain definitions above, the arbiters independently perform a round-robin determination for each domain to generate five domain winners (or fewer if there were no requesters in some domains). Round-robin is defined such that the winner of a domain will consequently have the lowest priority in the next arbitration for that domain. Once the five winners are determined, the arbiters select the winner with the highest domain priority. Thus, if data response requests exist, the winner of that domain will automatically gain the data bus, because of that domain's highest priority assignment. Also, in this case, if a UAnotD or an AnotD request exists, that domain's winner will also win, since a UAnotD or an AnotD winner can coincide on the system bus 108 with a DnotA winner.

The distributed approach used to implement the round-robin takes advantage of the four dead cycles between arbitration requests. During the cycles following arbitration cycle 202, the arbiters generate pointers to keep track of arbitration winners in each domain, but only if that domain won a line on the bus. These are called the "last" winners for each domain. Thus, at all times there are five last pointers: lastDnotA, lastUAnotD, lastUAD, lastAnotD, lastAD. To instill fair arbitration, each last winner will have the lowest priority for its corresponding domain during the next arbitration cycle. Therefore, the arbiters need to take this into consideration when generating the next winner.

Integration of the last winner information is done by filtering using a "mask" for each domain. The mask is generated by each arbiter based on two values: the last winner in that domain, and the "slot" number (e.g., slotID) of that node (e.g., board). (The slotID is simply a numerical value given to each node in the system. The preferred embodiment supports a total of 16 nodes. Thus, in the preferred embodiment, the slotID is a 4 bit number so that each of the 16 possible nodes has a unique slotID.) Given these two values, the mask is created so that it has a value of 1 for all other nodes which would have a higher priority given the last winner.

Because each node has its own arbiter to determine i_win and who_won, that node is considered the "host" node when it makes its determinations. Thus, for instance, if:

the last winner was slot number 11, the host node is slot number 5, and priority is given in decrementing order, then the mask would have value 1 in slot numbers 6 through 10, and zeroes elsewhere. This means that during arbitration 202, if the host node requested within this domain, and if no node with a slot number between six and ten made a request in this domain, then the host node would win this domain arbitration, because its slot number is 5, otherwise it would lose. The consequences of mask creation in this matter are such that during the arbitration resolution cycle 204, the only operation necessary to determine the winner is simply an ANDing of the mask with the arbitration vector for each domain. This is a much quicker operation than performing a full comparison of bits versus the last winner pointer.

The creation of the mask is also done during the dead cycles, and thus is not a time-critical component. It is accomplished by the following steps. First, two vectors VL and VS are created which help define the arbitration priority. The vector VL has value '1' for all bits which are lesser than the bit pointer (last) of that domain. Vector VS has value '1' for all bits which are greater than the bit pointer (slotID) which is the node slot number. Given these two vectors, we can create a new mask which is the exclusive OR of VS and VL. This will be our final resultant mask if the value of last is greater than our slotID. However, if last is smaller than slotID, we must invert this to get the final resultant mask, since the creation of VL and VS was originally done with the assumption that last>slotID.

Figure 3:
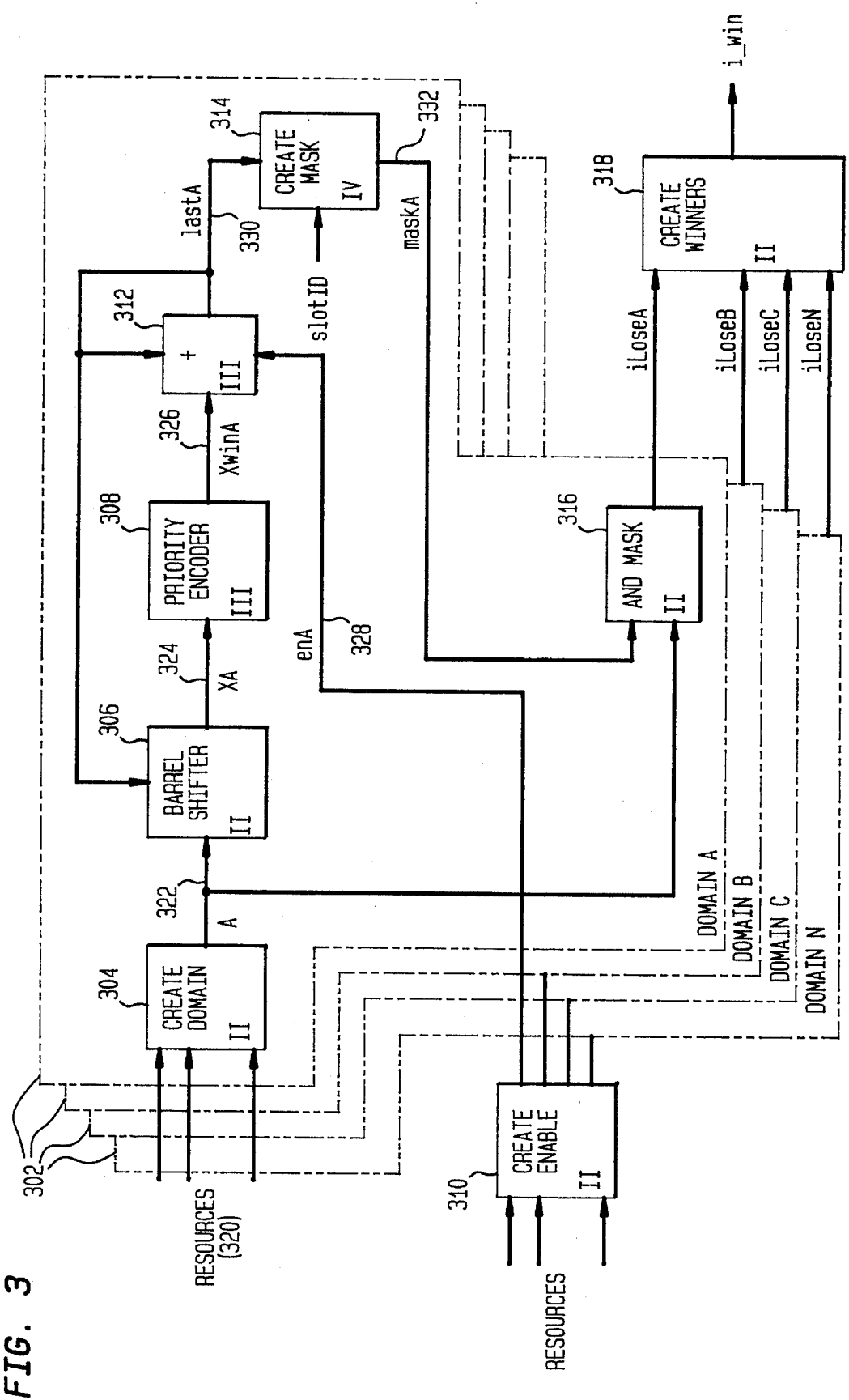
FIG. 3 shows a functional block diagram showing arbitration on a domain basis according to the present invention.

An exemplary, functional block diagram showing arbitration on a domain basis is shown in FIG. 3. This diagram is generic so domains 302 do not directly correspond to the five domains implemented according to the present invention. The generic domains include domains A, B, C . . . N. Domain A in FIG. 3 does not correspond to the non-urgent read (A) domain described above.

A total of eight (8) functional blocks 304, 306, 308, 310, 312, 314, 316 and 318 are shown FIG. 3. The functions performed by functional blocks 304, 306, 308, 312, 314 and 316 are performed on a per domain basis. The functions performed by functional blocks 310 and 318 are performed on a per node basis. Example bus cycles are shown in the lower left corner of each small box to temporally relate the functions performed by the functional blocks. It is during cycle (I) that nodes present their arbitration vectors on the arbitration bus; cycle (II) when each node does the thinking, or resolution; and cycle (III) when the winner(s) do the operation on the system bus(es) for which they arbitrated. Thus those operations performed in cycle (II) are the time critical ones, namely create_domain (304), AND_mask (316), and create_winners (318).

As a further example of the meaning of the cycle numbers in the functional blocks, consider blocks 306, 312 and 314. The adding function performed by functional block 312 is done during a cycle III. The result "lastA" is available at cycle IV so that lastA can be used by functional block 314 during cycle IV. LastA is a pointer to the member of the domain vector A which was the winner of the last arbitration cycle. The result lastA is also fed back to functional block 306 so that it can be used during the next cycle II and to functional block 312 so that it can be used during the next cycle III.

Input vectors 320 are input to a create domain block 304. In domain A (the top domain 302) a create domain block 304 translates the input vector into a domain vector A, as shown at 322.

According to the preferred embodiment, arbitration vectors U, A and D would be input to the create domain block 304 of each of the five domains. Each domain block 304 will then perform a bit-wise combination of the U, A and D arbitration vectors to generate a domain vector for the corresponding domain.

Figure 4:
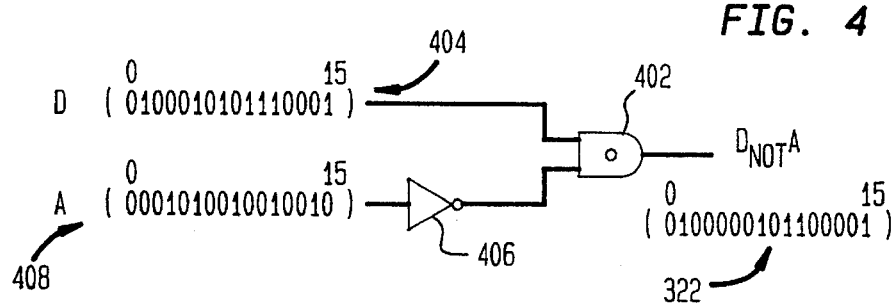
FIG. 4 is a diagram showing how domain vector DnotA is generated according to the present invention.

An example of how domain vector DnotA is generated is shown in FIG. 4. The create domain block 304 does a bit-wise ANDing (see AND gate 402) of the preferably 16 D arbitration line values 404 with the inverse (see invertor 406) of the preferably 16 A arbitration line values 408 to produce a 16 bit DnotA domain vector 322.

Referring again to FIG. 3, domain vector A 322 is rotated lastA locations by a barrel shifter 306 to yield a vector XA (as shown at 324) such that XA[0]=A[lastA], XA[1]=A[lastA+1], etc. This operation shifts domain vector A into a new space called the "X" space. Working in this new space assures that bit 0 is of lowest priority, bit 1 is of next lowest, etc.

A priority encoder 308 is then used to priority encode vector XA. The result of this priority encoding is a vector pointer called XwinA (as shown at 326) such that the member XA[XwinA] has value "1" while XA[max] down through XA[XwinA+1] all have value "0". In the preferred embodiment, vector XwinA is a 4 bit vector that represents a node that made a bus request corresponding this domain, which has been converted to the new "X" space by the barrel shifter and has highest priority. Hardware to implement the priority encoder 308 would be apparent to a person skilled in the relevant art.

XwinA represents the winner of domain A's arbitration. This, however, does not mean that lastA should be updated. It is only necessary to update lastA if this domain has won arbitration, which is a factor dependent upon the results of the other domains and the priority of this domain in relation to the other domains. Thus, an enable signal is necessary to indicate whether lastA should be updated. This enable signal is calculated in create enable block 310. An enable signal enA (shown at 328) is true if the lastA signal should updated. Last A should be updated if a bus request is made in this domain and if that node won arbitration in the last bus cycle. To make this determination, the create enable block 310 receives vector A and result information from all the domains. If lastA should be updated, a new lastA is created (as shown at 330) by adding the current value of lastA with the XwinA value to return from the XA space to the A domain space. This addition is performed by adder block 312.

Note that the adder block 312 functions to convert the vector XwinA back to the A domain space (or in the preferred embodiment, the DnotA space, for example). Because the A space vector was shifted by block 306 into the X space by the amount equal to lastA, the adder block 312 shifts the XwinA vector back to the A space by adding to it the lastA value. In the event that adding last A to XwinA is a value over 16, then 16 must be subtracted from the result to yield a valid result.

The final function of the non-timing critical section of the arbitration method is performed by a create mask block 314. The mask is created using the current value of lastA and a pointer to the identity of the node in the A vector (i.e., the host node). The slotID pointer is combined with lastA to generate a maskA (shown at 332) of all those vector members which have a higher priority that the host node.

An example of pseudo code representing the create mask functionality is shown below. Hardware logic implementation of the following create mask pseudo code would be apparent to a person skilled in the relevant art. Numerical examples follow the pseudo code

```
*create vector with value '1' for all bits greater than slotID.
for i = 0 to 15
    if(i > slotID) VS[i] = 1
    else VS[i] = 0
This is implemented in the best mode as follows:
        *create decoded version of 4-bit slotID pointer. Here
        only one bit of DS will have value '1', the one pointed
        to by slotID
        DS = decode4to16(slotID)
        *invert the 16-bit vector such that DSN(slotID) = 0,
        all others= 1
        DSN = invert(DS)
        *add one to this new 16-bit vector. This will effectively
        give every bit from slotID to 15 a value of '1',
        DSNp1 = DSN + 1
        *finally AND this with DSN to mask out bit member
        (slotID) which according to our original statement
        must also be of value '0'
        VS = AND(DSN,DSNp1)
*create vector with value '1' for all bits less than last
for i = 0 to 15
    if(i < last) VL[i] = 1
    else VL[i] = 0
This is implemented in the best mode as follows:
*create decoded version of 4-bit last pointer. Here only
one bit of DL will have value '1', the one pointed to
by last.
        DL = decode4to16(last)
*subtract one from this 16-bit vector. This will effectively give
every bit from 0 to last-1 a value of '1'.
        VL = DL − 1
*exclusive OR the two vectors to get preliminary mask.
        maskX = exor(VL,VS)
        *if last is greater than slot, then invert to get final mask,
        else maskX is the result
if(last > slotID)
    mask = invert(maskX)
else
    mask = maskX
```

The following are two examples of possible masks based on the example slot IDs and last winners. In these examples, the resultant mask will always be of value '1' for all those bits greater than slot and lesser that last, for reasons denoted in prior text.

Example 1 slotID=4, last=11

Example 1, a node with ID of 4, and a point in time in which node 11 was the previous winner for this domain. According to the algorithm, this means that node 11 has the lowest priority in this arbitration, and node 10 has the highest priority. As node 4, we should recognize that all nodes between the VS and 10 have higher priority, and thus should create a mask with value '1' for these bits 5–10 and '0' for the others. Thus, using this mask the host node can determine quickly with a bit-wise AND of its slot ID versus the actual arbitration vector in this domain, whether or not it wins arbitration.

| bit# | 111111<br>5432109876543210 | |
|---|---|---|
| DS = | 0000000000010000 | (DS[slotID] = '1') |
| DSN = | 1111111111101111 | (DSN = invert(DS)) |
| DSNp1 = | 1111111111110000 | (DSNp1 = DSN + 1) |
| VS = | 1111111111100000 | (VS = and(DSN,DSNp1)) |
| DL = | 0000100000000000 | (DL[last]= '1') |
| VL = | 0000011111111111 | (VL = DL − 1) |
| maskX = | 1111100000011111 | (maskX = exor(VS,VL)) |
| mask = | 0000011111100000 | (mask = invert(maskX))<br>(those wih higher priority:<br>5–10). |

Example 2 slotID=13, last=2

In Example 2, the host is node 13, and node 2 was the previous winner. This gives node 2 the lowest priority, and node 1 the highest. Also, note that nodes 14, 15, 0 and 1 have higher priority than this slot. Therefore, the host node should create a mask in which these bits have value '1', with the rest '0'.

| bit# | 111111<br>5432109876543210 | |
|---|---|---|
| DS = | 0010000000000000 | (DS[slotID] = '1') |
| DSN = | 1101111111111111 | (DSN = invert(DS)) |
| DSNp1 = | 1110000000000000 | (DSNp1 = DSN + 1) |
| VS = | 1100000000000000 | (VS = and(DSN,DSNp1)) |
| DL = | 0000000000000100 | (DL[last]= '1') |
| VL = | 0000000000000011 | (VL = DL − 1) |
| maskX = | 1100000000000011 | (maskX = exor(VS,VL)) |
| mask = | 1100000000000011 | (mask = mask(maskX))<br>(those with higher priority:<br>0,1,14,15 |

The "i_win" determination, a simple AND function of maskA with the actual arbitration vector A, generates a result indicating whether the host node lost the arbitration. The AND function is performed by a functional block 316 called the AND mask. If any members of the arbitration vector remaining after the AND mask have a value of "1", then the host node knows that it lost arbitration in this domain and AND mask block 316 outputs an "iLoseA" signal. Similarly, domains B, C . . . N will output iLoseB, iLoseC . . . iLoseN signals, respectively.

AND mask block 316 includes hardware to AND the two 16 bit vectors A and maskA together on a bit-wise basis, and OR all bits of the AND result. Thus, if any bit of the ANDed result is a one (1), the result of the OR operation will be a one (1) indicating that the node lost the arbitration in that domain (e.g., iLostA=1).

Once the i_lose values for each domain are available, the determination of the winners can be made, as shown at a create winners block 318. This involves not only each of the i_lose values, but also information inherent to the inter-domain priority scheme. This is not shown in the FIG. 3, but basically involves prioritizing each of the domains to determine which will prevail in case are of winners in multiple domains. For instance, if domain A has highest priority, it is known that if any arbitration member has entered a request in domain A, it will lose arbitration unless iloseA is false.

There is one exception to this rule. This is where the idea of multi-domain sharing comes into play. Assuming that the arbitration lines are resources shared by the nodes, based upon the creation of the domains from the resources, the utilization of the resources by each domain are known a priori. The fundamental unit of arbitration is the resource; arbitration is not done for the domains. Thus, multiple domains can simultaneously win, assuming they use orthogonal resources.

Returning the implementation according to the preferred embodiment, consider the example of the resources U, A and D, and two domains AnotD and DnotA. AnotD is defined as resource A's arbitration vector ANDed with the inverse of D's vector (i.e., it will be true when any slot requires only the A resource). Similarly, DnotA will be true when any slot requires only the D resource. In this instance, domain AnotD and DnotA can both have arbitration winners, with the former utilizing the A resource, and the latter the D resource. Thus, there are a total of two "i_wins".

While various embodiments of the present invention have been described above, it should be understood that they have been presented by way of example, and not limitation. It will be apparent to persons skilled in the relevant art that various changes in form and detail may be made therein without departing from the spirit and scope of the invention. The present invention should not be limited by any of the above-described exemplary embodiments, but should be defined only in accordance with the following claims and their equivalents. All cited patent documents and publications in the above description are incorporated herein by reference.

What is claimed is:

1. A method performed by a plurality of arbiters to control arbitration of requests for a multi-domain multiprocessor system bus, wherein the requests are generated by a plurality of nodes coupled to the multiprocessor system bus and the requests are presented on a plurality of arbitration request lines, wherein each node comprises one of the arbiters, comprising the steps of:

monitoring the requests on the arbitration request lines;

generating a plurality of domains based on a bit-wise combination of the requests on the arbitration lines;

assigning a domain priority to each domain relative to the other domains;

generating an i_win result by comparing said bit-wise combination of the requests with a last_winner mask, wherein said i_win result indicates whether the associated node is an overall arbitration winner of one of said domains, if a request from that node is pending;

generating a who_won result by using said i_win result and said domain priority, wherein said who_won result indicates which node was the overall arbitration winner and thereby allowing said winner access to said domain of the multiprocessor system bus; and after generating said who_won result, updating said last_winner mask using said who_won result.

2. The method according to claim 1, wherein said step of generating said i_win result is performed in a single bus cycle.

3. The method according to claim 2, wherein said step of generating said who_won result is completed after said i_win result is generated.

4. The method according to claim 1, wherein said step of generating said i_win result uses results of a previous who_won result.

5. The method according to claim 1, wherein said who_won result indicates another node as the overall winner of another domain and thereby allowing said winners concurrent access to the multiprocessor system bus in said domains.

6. The method according to claim 1, wherein each arbiter performs a round-robin determination for each domain to generate a winner for each domain based on previous who_won results, and an overall arbitration winner is determined based on said domain winners and said domain priorities.

7. The method according to claim 6, wherein said step of generating a who_won result uses said domain winner results.

A distributed arbitration system performed by a plurality of arbiters to

8. A distributed arbitration system performed by a plurality of arbiters to control arbitration of requests for a multi-domain multiprocessor system bus, wherein the requests are generated by a plurality of nodes coupled to the multiprocessor system bus and the requests are presented on a plurality of arbitration request lines, wherein each node comprises one of the arbiters, each arbiter comprising:

means for monitoring the requests on the arbitration request lines;

means for generating a plurality of domains based on a bit-wise combination of the requests on the arbitration lines;

means for assigning a priority to each domain relative to the other domains;

means for generating an i_win result, by comparing said bit_wise combination of the requests with a last_winner mask, wherein said i_win result indicates whether the associated node is an overall arbitration winner of one of said domains, if a request from that node is pending;

means for generating a who_won result by using said i_win result and said domain priority, wherein said who_won result indicates which node was the overall arbitration winner and thereby allowing said winner access to said domain of the multiprocessor system bus; and means for updating said last_winner mask using said who_won result.

9. The system according to claim 8, wherein said means for generating said i_win result is performed in a single bus cycle.

10. The system according to claim 9, wherein said means for generating said who_won result is completed after said i_win result is generated.

11. The system according to claim 8, wherein said means for generating said i_win result uses results of a previous who_won result.

12. The system according to claim 8, wherein said who_won result indicates another node as the overall winner of another domain and thereby allowing said winners concurrent access to the multiprocessor system bus in said domains.

13. The system according to claim 8, wherein each arbiter performs a round-robin determination for each domain to generate a winner for each domain based on previous who_won results, and an overall arbitration winner is determined based on said domain winners and said domain priorities.

14. The system according to claim 13, wherein said means for generating a who_won result uses said domain winner results.

* * * * *